July 14, 1936.  R. ATTI  2,047,541
AUTOMOBILE DIRECTION INDICATOR
Filed Dec. 2, 1932
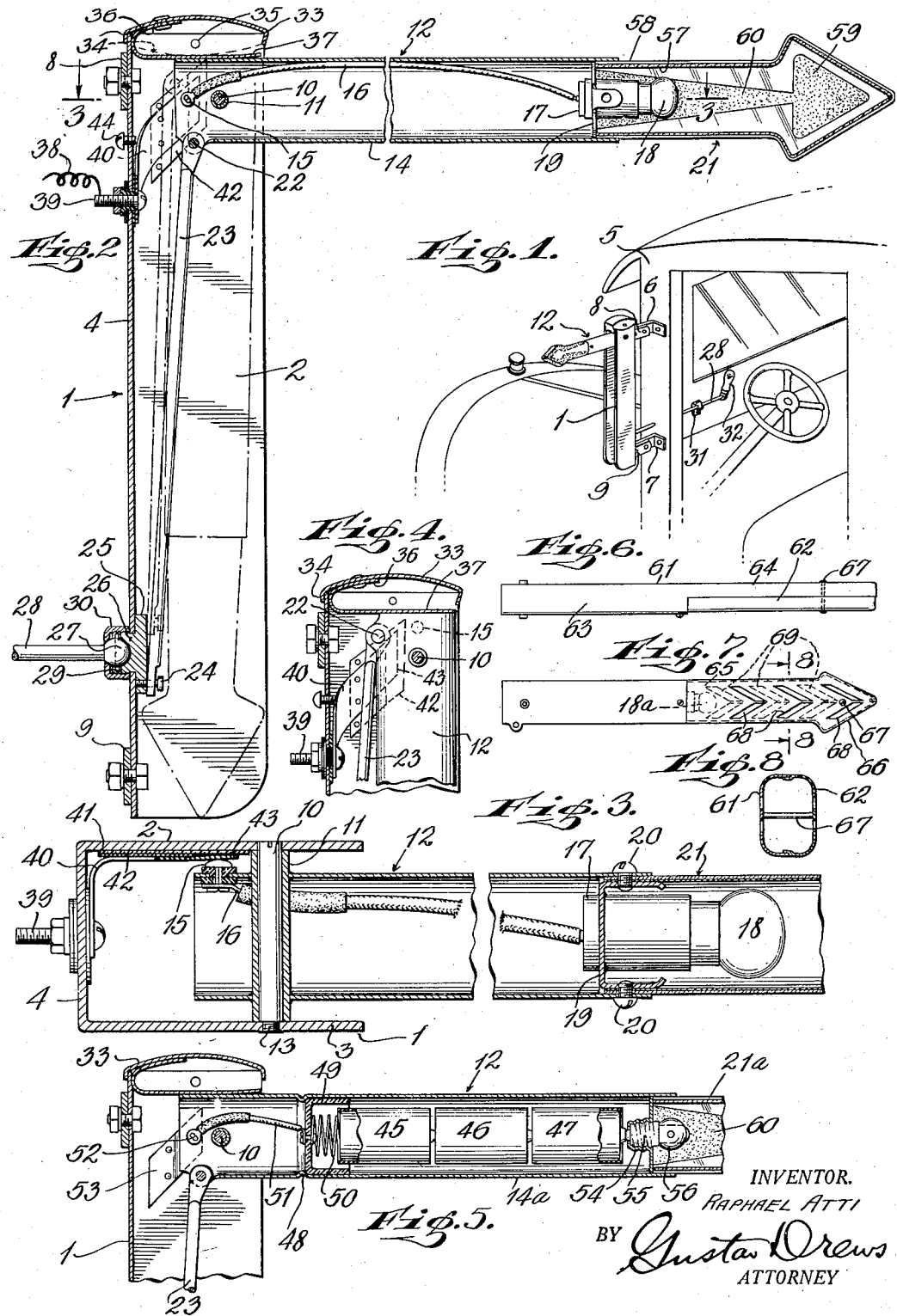
INVENTOR.
RAPHAEL ATTI
BY Gustav Drews
ATTORNEY Patented July 14, 1936

2,047,541

UNITED STATES PATENT OFFICE 2,047,541

AUTOMOBILE DIRECTION INDICATOR

Raphael Atti, Union City, N. J.

Application December 2, 1932, Serial No. 645,404

7 Claims. (Cl. 116—52)

This invention relates to automobile direction indicators in general and more especially to manually operated automobile direction indicators.

Among the objects of the present invention, it is aimed to provide an automobile direction indicator or signal which can be manufactured at low cost and be sold at a price within the reach of all operators of automobiles, the operation and cost of which is insignificant, and the operation of which can be effected by the most unskilled and weak requiring neither the exercise of any appreciable mental or physical effort.

Among the objects of the present invention, it is also aimed to provide an improved construction of manually operated automobile direction indicator which can be produced by the average machine shop without any special equipment and which consists essentially of standard parts now readily obtainable in the open market.

These and other features, capabilities and advantages of the invention will appear from the subjoined detail description of specific embodiments thereof illustrated in the accompanying drawing, in which Figure 1 is a fragmental perspective of an automobile equipped with the present automobile direction indicator, Fig. 2 is a transverse section of the indicator when in direction indicating position, showing its inoperative position in dash and dot lines.

Fig. 3 is a section on the line 3—3 of Fig. 2,

Fig. 4 is a fragmental section similar to Fig. 2 with the indicating arm illustrated in inoperative position, Fig. 5 is a transverse section of another embodiment in which the indicating arm is equipped with a battery chamber for illumination purposes.

Fig. 6 is an end elevation of still another type of arm to be used with the arrangements illustrated in Fig. 2 and Fig. 5, Fig. 7 is a side elevation of the arm illustrated in Fig. 6, and Fig. 8 is a section on the line 8—8 of Fig. 7.

In the embodiment illustrated in Figs. 1 to 4 inclusive, there is provided a vertically extending frame 1, which is substantially U-shaped, see Fig. 3, having the two lateral wall members 2 and 3 and the intermediate wall member 4. The intermediate wall 4 in the present instance is adapted to be connected to the side of an automobile 5 as indicated in Fig. 1.

In the present instance, there are provided two L-shaped brackets 6 and 7 which are secured to the frame of the automobile 5 and which brackets 6 and 7 are in turn connected to L-shaped brackets 8 and 9 connected to the outer faces of the intermediate wall 4. The walls 2 and 3 are provided with a pivot pin 10 near their upper ends which is adapted to extend through the cylindrical bearing 11 of the indicator arm 12. The pin 10 is preferably provided with a screw threaded end 13 to engage the threaded portion in the wall 3 as indicated in Fig. 3. The arm 12 has an inner chambered portion 14 preferably composed of metal.

The inner end of said arm portion 14 has secured thereto a contact button 15 which is insulated from said arm 12 and connected by the conductor 16 with the socket 17 for receiving the lamp 18. The socket 17 is preferably formed in a bracket 19 as indicated, the side arms of which are connected to the outer end of the arm portion 14 by means of the screws 20 or the like which extend from the arm portion 14, through the wall portions of an outer arm portion 21 and then into the flanges of the bracket 19 to secure all three members to one another. The inner end of the arm portion 14, see Fig. 2, is also provided with a pivot pin 22 for pivotally connecting the link 23 with the abutment 24 on the disc 25, thus forming a pivotal anchor for the lower end of the link 23. The disc has an outwardly extending hub 26 rotatably mounted in the intermediate wall 4 of the frame 1.

This hub 26 has a concave groove or socket to receive the ball 27 at the end of the handle shaft 28. This ball 27 is provided with a pin 29 extending into recesses formed in the hub 26 so that angular movement may be translated to the hub 26 by the handle shaft 28 and yet the handle shaft 28 may be rocked relative to the hub 26 about the axis determined by the pin 29 to facilitate installation. For anchoring the ball 27 in position in the hub 26, the cap 30 is provided and screw threadedly connected to the hub as shown.

As indicated in Fig. 1, the handle shaft 28 may be rotatably mounted in a bracket 31 secured to the dash board of the automobile and the end of the handle shaft 28 provided with a suitable handle grip 32 as illustrated.

The upper end of the frame 1 is preferably provided with a cap 33 which has downwardly extending flanges 34 to snugly fit the outer faces of the upper ends of the walls 2, 3, and 4 of the frame. As indicated this cap 33 is preferably secured to the frame 1 by the pins or screws 35 connecting the flanges 34 with the walls 2 and 3.

For anchoring the arm 12 in raised position and also for resiliently locating it in lowered or inoperative position, there is provided the flat spring 36 which is secured to the upper wall of the cap 33 and loops down to form a flat portion 37 in position to engage either the wall of the arm 12 as indicated in Fig. 2 to anchor the arm 12 in raised position or else engage the inner upper end of the arm 12 as indicated in Fig. 4 to anchor the arm 12 in lowered position.

With the embodiment illustrated in Figs. 1, 2, and 3, the lighting system of the arm 12 may be connected to the battery of the car or other battery remotely disposed relative to the frame 1 in which case one terminal of such battery is grounded to the frame of the car and the other terminal connected by the conductor 38 with the binding post 39 which is insulated from the intermediate wall 4 and connected to the contact plate 40, see Figs. 2 and 3, which contact plate 40 has in the present instance a portion extending parallel to the intermediate wall 4 and another portion extending parallel to the wall 2.

The wall 2 has preferably formed on its inner face an insulating sheet 41 which has connected thereto the intermediate sheet 42 to which sheet 42 in turn is connected the contact plate 40. The contact plate 40 has its free end portion 43, see particularly Fig. 3, extending beyond the intervening sheet 42 so that it may be free to flex inwardly when it is engaged by the contact button 15 of the arm 12.

The outer free edge of the portion 43 of the contact plate 40, see Figs. 2 and 4, is so positioned that it will clear the contact button 15 when the arm 12 is in lowered or inoperative position, that illustrated in Fig. 4, and on the other hand cause the contact button 15 to engage the flexible end portion 43 as illustrated in Fig. 2 when the arm 12 is in raised position. The circuit for the lamp 18 in the present instance will then be established when the arm 12 is in raised position due to the fact that one terminal of the battery to which it is connected is grounded to the car, and the other terminal is connected to the conductor 38 which in turn is connected to the lamp 18 by means of the contact plate 40, contact button 15 and conductor 16 while the other terminal of the lamp 18 is connected to the metallic frame of the arm 12 and frame 1 to the car.

If the housing of the car is not composed of metal, then the frame 1 is preferably provided with a separate binding post or screw 44 to receive a conductor for connecting the frame 1 with the metal portion of the car that is grounded.

In the embodiment illustrated in Fig. 5 instead of a remotely positioned battery, there is provided a series of batteries 45, 46, and 47 connected to one another and located in the arm 12.

The arm 12 in the present instance is provided with an annular indented rib 48 to form a seat for the bracket 49 which is provided with a spring conductor 50 serving not only as a conductor between the bracket 49 and the battery 45 but also for a resilient seat or flexible spacing member between the battery 45 and bracket 49.

The bracket 49 in the present instance is connected by the conductor 51 with a button or contact 52 similar to the button 15, which contact 52 is adapted to engage the contact plate 53 secured to the frame 1. The battery 47 in the present instance is adapted to be connected to the center contact of the lamp and then back through the bracket or socket 54 secured to the inner portion 14ᵃ of the arm 12 which bracket is preferably threaded to receive the plug 55 of the lamp 56.

In the present instance, the bracket 54 is also preferably provided with flanges, such as illustrated in Fig. 3 for the bracket 19, which are connected to the arm portion 14ᵃ and the arm portion 21ᵃ.

The arm portion 21ᵃ in the embodiment illustrated in Fig. 5 and also the embodiment illustrated in Fig. 2, is preferably composed of two complemental celluloid shells 57 and 58 formed to simulate an arrow as indicated in Fig. 2. These shells 57 and 58, see particularly Fig. 2, are preferably composed of a translucent material to facilitate the passage of light rays therethrough when the lamp 18 is illuminated. Preferably also sharply to define a danger signal, the inner faces of the arrows may be provided with a red colored pattern composed as illustrated in Fig. 2 of an arrow head 59 and an inwardly extending arm 60, the arrow head 59 being located in the arrow head shaped portion of the arm 21, and the arm 60 being disposed in the elongated portion of the arm 21.

In the embodiment illustrated in Figs. 6, 7, and 8, a substitute is provided for the arm 12. The arm here illustrated consists essentially of two parts, 61 and 62. These parts are preferably composed of sheet metal. The portion 61 consists essentially of a substantially rectangular chambered arm portion 63 forming a substitute for the arm portion 14 of Fig. 2 and having a second portion 64 constituting one-half of the outer arm portion used in place of the arm portion 21 of the embodiment illustrated in Fig. 2. The second part 62 constitutes the other half of the outer arm portion. The portions 64 and 62 are thus complements of one another, each having an elongated inner portion 65 and an outer arrow head shaped portion 66. The portion 62 is secured to the portion 64 by the screw 67 connecting the two together.

The lamp 18ᵃ is positioned and secured in place according to the electrical connection used, as illustrated in Figs. 2 and 5.

The portions 62 and 64 are composed of metal as aforesaid and in order to permit the light to pass out from the same and thus form a signal, openings are formed in the portions 64 and 62. These openings are preferably staggered relative to one another as illustrated in Fig. 7. Preferably as illustrated the portion 62 is provided with three V-shaped openings 68. The portion 64 is provided with similar V-shaped openings 69, the openings 69 being staggered relative to the openings 68.

The inner faces of the portions 64 and 62 are preferably stained a striking color so that when the inside of the insulating chamber is illuminated by the lamp 18ᵃ, it will cause the light to be reflected from such strikingly colored inner face through the openings 68 and 69.

The arm 12 of the embodiments illustrated in Figs. 2 and 5 and the arm 61 of the embodiment illustrated in Fig. 6 may also be provided with a striking color on its outer surface such for instance as red so that the signal arm may immediately attract attention when operated into direction signaling position.

It is obvious that various changes and modifications may be made in the details of construction without departing from the general spirit of the invention as set forth in the appended claims.

I claim:

1. In an automobile direction indicator, the combination with a vertically extending frame, of a device pivotally connected to the lower end of said frame, a handle operatively connected to said device, a signal arm pivotally connected to the upper end of said frame, a link operatively connecting said device to said arm, and a flat spring at the upper end of said frame, said arm having two right angularly disposed faces at its inner end, one to engage said spring and anchor said arm in extended position and the other face to engage said spring and anchor said arm in suspended position.

2. In an automobile direction indicator, the combination with a vertically extending frame, said frame being U-shaped in cross-section with two lateral walls and an intermediate wall, of a device pivotally connected to the lower end of said intermediate wall, a handle operatively connected to said device, a signal arm pivotally connected to the upper ends of said lateral walls, a link operatively connecting said device to said arm, a cap secured to the upper end of said frame, and a spring secured to said cap and operatively associated with said arm to anchor said arm in either extended position or suspended position.

3. In an automobile direction indicator, the combination with a vertically extending frame having two parallel walls and an intermediate end wall, of a disc pivotally connected to the lower end of the inner face of said intermediate wall, a handle operatively connected to said disc, a signaling arm pivotally connected to the upper ends of said parallel walls and extending between said parallel walls in suspended position, a link disposed inside of said frame and operatively connecting said disc with said arm, a cap secured to the upper end of said frame, and a flat spring secured to said cap, the inner end of said arm having two faces at right angles to one another, one to engage said flat spring to anchor said arm in extended position and the other to engage said spring and anchor said arm in suspended position.

4. In an automobile direction indicator, the combination with a frame, of a disc pivotally connected to the lower end of said frame, a signaling arm pivotally connected to said frame, a link operatively connecting said arm to said disc, said disc having a hub provided with a concave socket, a handle having a ball at the end thereof to fit into said socket, a cap connected to said hub for anchoring said ball in place, and a pin on said ball operatively connected to said hub to facilitate the angular actuation of said hub by said handle and yet permit rocking movement of said handle relative to said hub.

5. In an automobile direction indicator, the combination with a frame, of a device including a disc and a hub, the hub extending through said frame and forming the pivotal mounting of said device in said frame with the disc engaging one face of said frame, a signaling arm pivotally connected to said frame, a link pivotally connected at one end to said signalling arm and pivotally connected at its other end to a portion of said disc removed from the center of rotation of said disc, and a handle shaft pivotally connected to the portion of the hub extending beyond the other face of said frame to enable said shaft to rock about an axis at right angles to the axis of rotation of said disc in such a manner that such rocking of the shaft relative to said disc will not effect the operation of said disc and therefore of said signaling arm but will facilitate installation and rotation of said handle shaft on the axis of said disc will effect the operation of said disc and therefore of said signaling arm.

6. In an automobile direction indicator, the combination with a frame, of a device including a disk and a hub, the hub extending through said frame and forming the pivotal mounting of said device in said frame with the disk engaging one face of said frame, a cap removably secured to the projecting end of said hub and abutting against the other face of said frame, a signaling arm pivotally connected to said frame, a link pivotally connected at one end to said signaling arm and pivotally connected at its other end to a portion of said disk removed from the center of rotation of said disk, and a handle shaft connected to the portion of the hub extending beyond the other face of said frame.

7. In an automobile direction indicator, the combination with a frame, of a signaling arm pivotally connected to said frame, a link pivotally connected at one end to said signaling arm, and means for operatively connecting the other end of said link to said frame including a disk having a hub carried thereby with the hub extending through said frame and forming the pivotal mounting for said disc, a cap removably connected to the projecting end of said hub, the other end of said link being pivotally connected to a portion of said disk removed from the center of said disk, an operating handle, and a universal joint connecting said handle to said link and including an end of said handle, said cap and the projecting end of said hub, whereby movement of the handle is transmitted to said arm.

RAPHAEL ATTI.